United States Patent
Gnaedinger, Jr. et al.

[15] 3,641,811
[45] Feb. 15, 1972

[54] METHOD AND APPARATUS FOR DETERMINING STRUCTURAL CHARACTERISTICS

[72] Inventors: Robert J. Gnaedinger, Jr., 1387 Lincoln Avenue South, Highland Park, Ill. 60035; John P. Gnaedinger, 160 Sheridan Road, Kenilworth, Ill. 60043

[22] Filed: Dec. 2, 1969

[21] Appl. No.: 881,482

[52] U.S. Cl. ..................................73/69, 73/67.7, 73/71.5
[51] Int. Cl. ........................................................G01n 29/00
[58] Field of Search ................73/67.5, 67.6, 71.5; 340/400; 73/88

[56] References Cited

UNITED STATES PATENTS

| | | | |
|---|---|---|---|
| 3,066,525 | 12/1962 | Harris | 73/67.5 X |
| 3,521,483 | 7/1970 | Miller | 73/67.5 |
| 2,220,979 | 11/1940 | Swanson | 340/400 |
| 3,292,143 | 12/1966 | Russell | 181/0.5 |
| 3,503,252 | 3/1970 | Miller | 73/71.5 |

FOREIGN PATENTS OR APPLICATIONS

| | | | |
|---|---|---|---|
| 494,971 | 8/1953 | Canada | 73/67.5 |
| 417,152 | 1/1967 | Switzerland | 73/95 |

*Primary Examiner*—Richard C. Queisser
*Assistant Examiner*—Arthur E. Korkosz
*Attorney*—McDougall, Hersh, Scott & Ladd

[57] ABSTRACT

A method and apparatus for determining the soundness of a structure such as a foundation pier or caisson wherein a generator for producing sonic pulses or mechanical vibrations is located in the body of the structure at a location remote from a detecting location. The detector is positioned at the detecting location with at least some of the structure body being disposed between the generator and detector whereby there is transmission through the body. Recording means are provided for determining the characteristics of the pulses detected thereby providing an indication of the quality of the structure.

12 Claims, 8 Drawing Figures

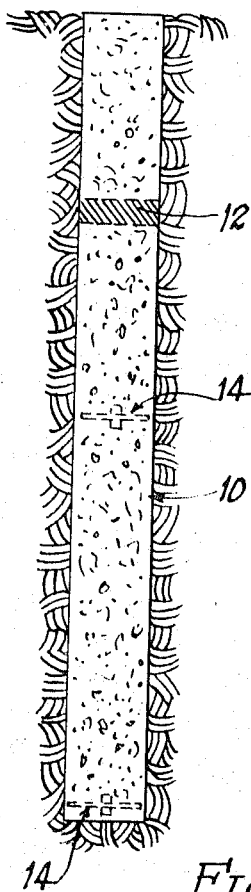
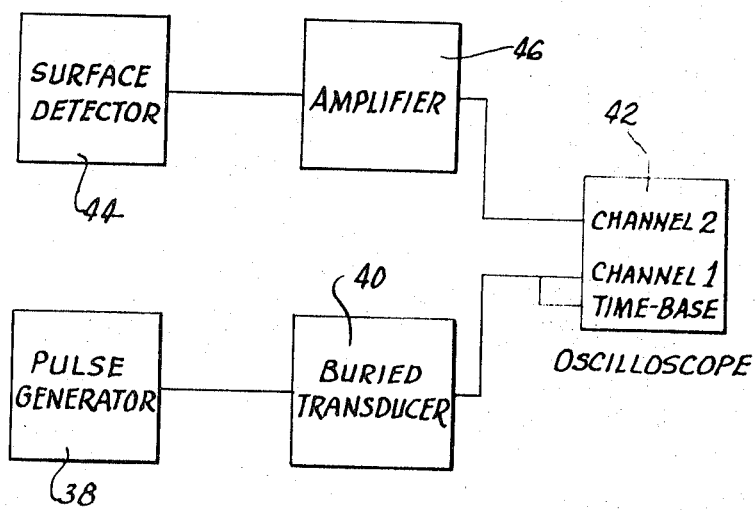
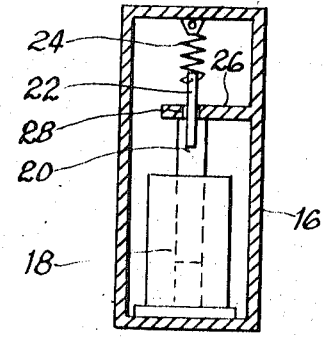
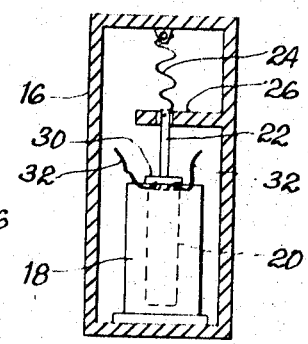
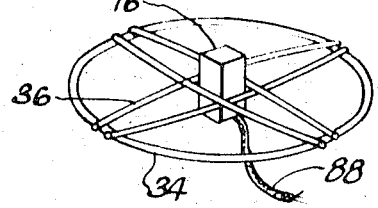
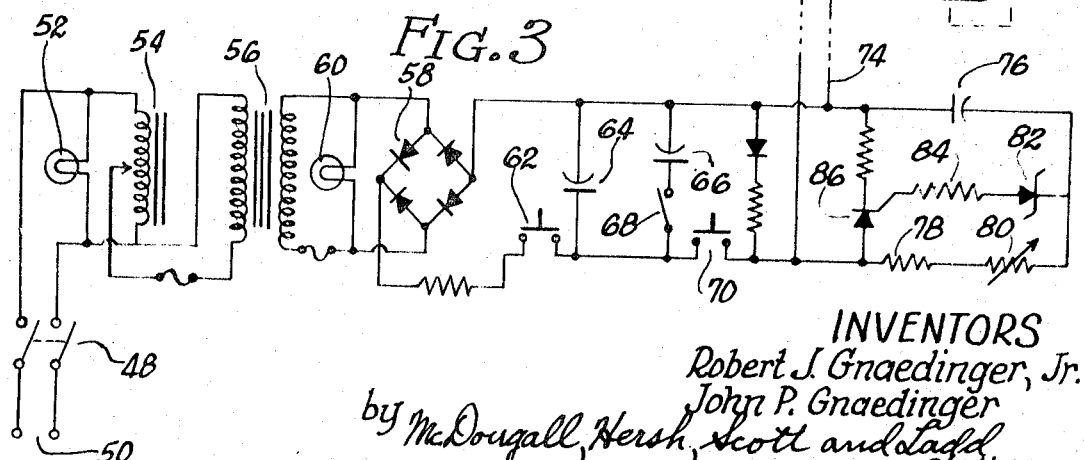
INVENTORS
Robert J. Gnaedinger, Jr.
John P. Gnaedinger
by McDougall, Hersh, Scott and Ladd
Att'ys

METHOD AND APPARATUS FOR DETERMINING STRUCTURAL CHARACTERISTICS

This invention relates to a system for determining the soundness of structural bodies. The invention is particularly directed to a method and apparatus which can be utilized both during the formation of structures, particularly during initial forming stages, and which is also useful throughout the life of the structures.

The invention will be described with reference to caissons or foundation piers. The terms "caisson" and "foundation pier" are intended to apply to structures which are produced by providing a confined area and then pouring concrete or the like into the area to build up a solid body. This structure can then be used as a foundation support for a building or for supporting other structures such as a bridge.

It will also be understood that the invention applies to various other structures such as dams, and various underground structures including missile silos, shelters, dwellings, and mines. "Concrete" will be referred to as the material used in forming the structures, and this term should be interpreted as including any cast-in-place material which will "set up," that is, which experiences a substantial growth in shear modulus with time.

The invention calls for the use of impact means or other devices which will produce sonic pulses or mechanical vibrations. The term "sonic pulses" will be employed to cover all measurable signals, whether in the subsonic sonic, or ultrasonic range, which are capable of being transmitted through a concrete body as described herein.

A system for nondestructive testing of concrete caissons has been sought for many years. Caissons, particularly in the construction of large buildings, comprise massive bodies which are extremely important in an overall building structure. It is very necessary to provide caissons of satisfactory quality since serious problems can arise when a building is located on defective caissons.

Because of the mass of many caissons, and because they are often located deep in the ground, it is extremely difficult to analyze caissons for defects. In some instances, defects have only been discovered after portions of a building are raised over the caissons since the load-bearing capacity cannot otherwise be tested. Where this occurs, it is often necessary to reconstruct the caissons, usually at very great expense.

Since caissons are made of concrete, and since some defects in concrete do not show up immediately when a load is applied, buildings have been completed before any defects were recognized. In these instances, expensive substitute supporting measures have been resorted to; however, in virtually all cases, it is impossible to completely correct the problems.

The presence of defects in caissons is not uncommon because of various problems which can arise during construction of a caisson. If there is excessive mixing of the concrete with underground water, portions of the materials may wash out resulting in stratification of the composition. Excessive mixing of the concrete with soils and clays or with debris will result in a low-strength composition or inclusions of low-strength materials. Air and water pockets may occur if the concrete does not settle properly. Lateral intrusions of clays and silts can occur which would provide a reduced caisson cross section or even complete severing of the caisson. Such intrusions can also occur at the bottom of the caisson in the area above a rock foundation which could be very detrimental to the bearing capacity since the concrete to rock interface in this area is critical. Finally, poorly controlled mixing of concrete may result in inferior areas in the caisson.

Even where a caisson is properly made in the first instance, natural voids in the earth or shifting of the earth, for example as the result of an earthquake or water table change, can create difficulties. There is no satisfactory way to determine the extent of such problems with present techniques.

It is a general object of this invention to provide an improved system for determining the soundness of structural bodies such as construction caissons.

It is a more specific object of this invention to provide a method and apparatus which can be directly associated with various structures and which will serve to detect a variety of defects in the structures.

It is an additional object of the invention to provide means for detecting the characteristics of the concrete to rock interface at the base of structures such as caissons.

It is a still further object of this invention to provide a method and apparatus of the type described which can be utilized for determining the quality of structures both during the early stages of the structural formation and throughout the life of the structures.

It is a further object of this invention to provide means suitable for determining structural characteristics under dynamic conditions, for example, where the structures are affected by windstorms.

These and other objects of this invention will appear hereinafter and for purposes of illustration, but not of limitation, specific embodiments of the invention are shown in the accompanying drawings in which:

FIG. 1 is an illustration of typical caisson constructions which may utilize the system of the instant invention;

FIG. 2 comprises a block diagram illustrating electrical components employed in the system;

FIG. 3 comprises a circuit diagram illustrating a typical arrangement of components employed for energizing the sound-generating means;

FIG. 4 is a sectional view of a housing containing sound-generating components;

FIG. 5 is a sectional view of an alternative arrangement of sound-generating components;

FIG. 6 is a perspective view of a frame and associated instrument housing adapted to be located within the body of a caisson; and;

Figure 7:
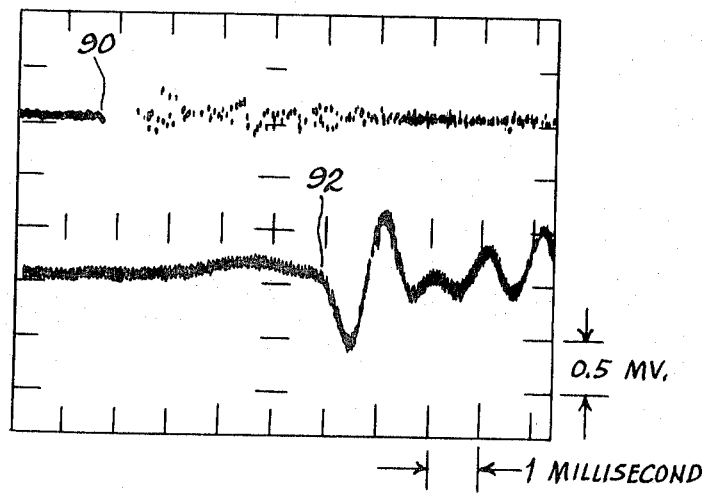
FIGS. 7 and 8 are illustrations of typical patterns developed on an oscilloscope screen during testing of caissons.

The system of this invention involves a method for determining the soundness of structures such as caissons of the type formed by introducing concrete into a confined area. The method involves locating sonic pulse or mechanical vibration generators in the body of the caisson and providing a suitable detector at a location remote from the generator. The detector is located so that pulses generated must pass through a portion of the body of the caisson before being detected. The influence of the caisson body on the pulse characteristics, for example as determined by wave shape on an oscilloscope screen, can be recorded.

In one preferred form of the invention, the pulse generator is mounted on a supporting frame with the frame being embedded within the body of the caisson. The pulse generator may consist of a solenoid located in a housing with the core of the solenoid providing a striker whereby energization of the solenoid will cause the striker to hit a striking surface of the housing. Electrical contacts may be located in the housing for engagement by the striker when it hits the striking surface. By connecting leads to these contacts, the instant of initial sound development can be determined so that a time relationship can be established. The leads may instead be connected to a piezoelectric crystal mounted on the housing, to a magnetic or electromagnetic detector, or to any other device capable of developing a time-zero signal.

In addition to providing means for detecting the time of pulse travel through a body portion of a caisson, the system may measure other characteristics. The amplitude of the pulse detected in one caisson may be compared with amplitude from other caissons. By providing a constant initial pulse, or by providing means for measuring the amplitude of the pulse in the area of pulse generation for comparison purposes, amplitude differences will provide a measure of the caisson characteristics.

Other wave shape characteristics may also be employed for comparison purposes. These comparisons can be made by developing a set of wave shape characteristics which are known to prevail in caissons of proper soundness and of similar composition and location. Such universal data can be developed to at least provide minimum standards for caissons quality. Where caisson designs do not conform to usual standards, the system of this invention can still be employed to provide a warning of possible defects. Thus, it has been found that certain defects will result in certain characteristics and measurement which, when compared with characteristics and measurements obtained from caissons of similar design, known to be sound, will provide an indication of possible problems. This can be particularly valuable for purposes of avoiding expensive dismantling and rebuilding operation which can result where defects are only discovered at a later time.

FIG. 1 generally illustrates caissons 10 which are typical of caissons employed for building relatively large buildings such as office buildings, high rise apartments, etc. These caissons extend from ground level several feet into the ground, preferably to a rock base. The caissons are typically formed by excavating a suitable hole which then provides a confined area into which concrete can be poured.

If the concrete poured is relatively uniform. and if foreign materials do not interfere during pouring and setting of the concrete, then a sound caisson will result. In some instances, however, for example as shown at 12, a significant defect may occur. This defect may result from the presence of falling rock or soil from the walls of the excavation, from seepage which could lead to water pockets or from various other sources.

In accordance with the practice of this invention, sound pulse generators 14 are associated with the caisson. In the example illustrated, one of the generators is located at the bottom of the caisson and the other is located at about the midpoint of the caisson. In a typical installation, the caisson may be 60 feet long. As a sound pulse detector is located adjacent the upper end of the caisson, pulses will travel through 60 feet of caisson body when generated by the lower sound pulse generator and through 30 feet of the caisson body when generated by the other sound pulse generator.

FIG. 4 illustrated a sound pulse generator which represents the preferred type used with the system of this invention. This generator comprises a housing 16 which comprises a rigid body which may be formed from steel or other metal, plastic, concrete, rock, etc. A solenoid 18 is mounted within the housing with the core 20 of the solenoid being normally located in the position shown.

The core 20 is attached to a rod 22 which is secured to the housing 16 by means of a spring 24. The spring 24 thus opposes movement of the core 20 when the solenoid 18 is energized. A plate 26 extends outwardly from one wall of the housing 16, and a passage 28 is provided in this plate. The rod 22 extends through this passage to serve as a guide during movement of the core 20 and associated rod.

When the solenoid 18 is energized, the core 20 will be pulled in, in opposition to the spring 24. When the solenoid is deenergized, the spring 24 will pull the core back to the position shown with the core striking the plate 26. This will result in the development of a sound pulse which will be transmitted through the body of the caisson. This operation can be controlled so that two distinct pulses arise, the first occurring as the core strikes a seat provided within the solenoid body and the second occurring as the core strikes the plate 26 as just described. Opposite pulse phases can be provided in this manner.

FIG. 5 illustrates an alternative arrangement wherein a collar 30 is secured to the rod 22. When the solenoid 18 is energized, the core 20 will be pulled in, and the collar 30 will strike the body of the solenoid. Thus, the sound pulse is developed upon energizing the solenoid rather than upon the return stroke of the solenoid. The spring 24 should be selected so that it will not unduly restrict movement of the core whereby the core will rapidly accelerate to provide an adequate sound pulse. In FIG. 5, this spring is shown in its extended position, and when the solenoid is deenergized, the spring will operate to move the core and associated collar away from the position shown.

The structure of FIG. 5 includes a pair of electrical leads 22, insulated from the leads for the solenoid to eliminate spurious time-zero readings, which extend to spaced contacts positioned on the solenoid 18. When the collar 30 engages the solenoid, it will bridge these contacts thereby providing a detectable electrical signal. This signal, referred to as the "time-zero" signal is used as a basis for determining the time required for a sound pulse to travel through the caisson body. Similar contacts may be associated with the plate 26 where this plate operates as a striking surface during production of a sound pulse. As previously indicated, the leads 32 could be attached to a piezoelectric crystal or other time-zero detector associated with the housing.

FIG. 6 illustrates a suitable rig for supporting the housing 16 The rig consists of a circular rim 34 and transverse bars 36 which provide a means for holding the housing 16 at the center of the rim. This rig provides a highly suitable means for positioning the housing 16 at the center of the caisson. Thus, the diameter of the rig may be only slightly less than the dimensions of the excavation. When the rig is lowered with the housing 16 at is center, this housing will necessarily be positioned at approximately the center of the caisson. The relatively large size of the rig also provides a relatively horizontal attitude for the rig to maintain conditions as uniform as possible from one caisson to the next.

FIG. 2 comprises a block diagram generally illustrating the mechanisms utilized in the system. The pulse generator 38 feeds signals to the buried transducer 40 which preferably comprises an arrangement such as shown in FIGS. 4 and 5. The time-zero signal is fed through to one channel of the oscilloscope 42. A surface detector 44 is provided for picking up the pulses and after these pulses are amplified by the mechanism 46, they are fed to a separate channel of the oscilloscope. The surface detector may comprise any suitable device such as a geophone, for example a Geo Space Model X-2S land geophone. An Endevco Model 2213 M5 accelerometer has also been found satisfactory for this purpose. The geophone described is essentially a velocity sensing unit with a resonant frequency at 14 Hz. and a sensitivity of approximately 0.5 v./in./sec. The accelerometer described is a piezoelectric type with a resonant frequency of about 35 kHz. and a sensitivity of 28 peak mv. per peak g.

The oscilloscope may also comprise various known devices. A Tektronix 564 storage-type oscilloscope has been utilized. The amplifier employed comprises a 3A6 dual trace vertical amplifier plug-in unit, and a 3B3 time base generator with a time delay. A model 2820 data amplifier manufactured by the Dana Corporation is suitable for use as an amplifier for signals from low impedance sources, such as a land geophone.

In addition to the oscilloscope readings or as a substitute therefor, the pulses may be transmitted to a recording device, for example, a magnetic tape. The recorded information can then be fed to a computer whereby a permanent record, available for detailed inspection is provided. A camera may be used for recording a particular portion of the display.

A preferred arrangement for energizing the solenoid 18 to provide pulse generation is illustrated in FIG. 3. The circuit includes a main switch 48 attached to 115-v. AC input 50. A pilot light 52 may be provided for indicating that the switch 48 is closed.

A variable auto transformer 54 and isolation transformer 56 receive the power input and supply 200 -v. AC power-to-rectifier bridge 58. A second pilot light 60 may be provided for indicating the presence of transformer input to the rectifier bridge.

The switch 62 comprises the "arm" switch serving to charge the capacitor 64. A second capacitor 66 may alternatively be included in this phase of the operation if the switch 68 is closed. The switch 70 serves as the firing switch. When this switch is operated, current flows through lines 72 and 74 to solenoid 18. In a preferred arrangement, current flow of 20 to 30 amperes for several milliseconds is provided. Because of this relatively high solenoid-energizing current, a timing circuit is provided which will shut off current flow to the solenoid.

The time delay circuit includes capacitor 76 which begins charging as current flows through resistor 78 and variable resistor 80 upon closing of the firing switch 70. When the capacitor 76 is charged, this current flow is diverted through Zener diode 82 and resistor 84 for triggering the silicon-controlled rectifier 86. When the SCR is turned on, it becomes an effective low resistance whereby the solenoid 18 will be deenergized since the capacitors 64 and 66 will complete discharge through the SCR.

It has been found that the use of a control circuit such as shown in FIG. 3 along with the solenoid structure shown provides one effective means for generating the sound pulses. Distinct and carefully controlled pulses are most desirable for purposes of providing reproducible conditions which will provide data of real significance. Thus, if it is known that the sound pulse generation in various caissons is substantially the same, the characteristics read by the detecting means will truly serve to detect the relative soundness of the caissons. In addition to providing results for a series of caissons which can be compared with each other, the system of this invention contemplates the preparation of table which will indicate standard characteristics for caissons of various sizes and types whereby the characteristics of new installations can be compared with such standards.

Figure 8:
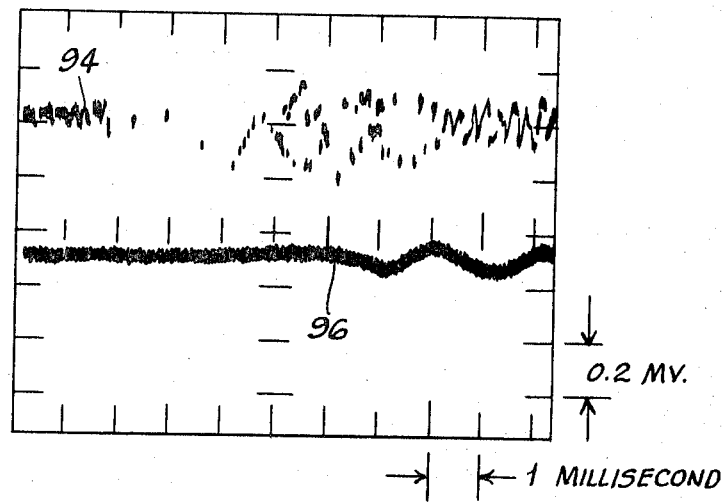

FIGS. 7 and 8 illustrate oscilloscope patterns of the type which can be developed when employing systems of the type described. The signal trace shown in FIG. 7 was developed during testing of a caisson known to have a sound body structure. The upper trace is a representation of the signal transmitted through the wires employed for time-zero measurements. In this case, a piezoelectric crystal was utilized as the time-zero detecting means, and the time-zero point is shown at 90.

The lower trace in FIG. 7 is a representation of the mechanical vibration signal received by the geophone. The first indication of receipt of a significant sound pulse is shown at 92. The distance between the points 90 and 92 provides a measurement of the times of pulse travel through the caisson body. The amplitude of the lower trace provides an indication of the intensity of the pulse when reaching the detecting point.

In FIG. 8, the upper trace indicates time-zero at the point 94, and the lower trace indicates the first pulse measurement at 96. A deliberate defect was formed in the caisson being measured here. A comparison of the results shown in FIGS. 7 and 8 permits both time and amplitude comparisons. Obviously other factors such as the locating of the detecting and generating means, the types of material used, the influence of outside noise, etc., must be considered when comparing results; however, it will be apparent that data can be complied which will permit independent analysis with the systems of this invention.

In the specific arrangement shown, the solenoid 18 is subjected to 200 to 250 volts; however, the timing circuit can be set to limit this exposure to a few milliseconds. Obviously, the specific ratings and characteristics of the various components can vary considerably while still achieving the basic function of energizing the solenoids at a high rate whereby a distinct and controlled sound pulse will be developed. The breakdown voltage of the diode 82, the resistance of the resistor 78 and the setting of the resistor 80, and the characteristics of the SCR 86 are some of the factors which must be considered.

In the use of the system described, one or more rigs consisting of the housing 16 and associated frame are located in the caisson body. As a practical matter, one of the rigs may be located adjacent the bottom of the caisson after the excavation is prepared. The design of the rig and the protective housing 16 will maintain the attitude of the construction even when concrete is dropped from several feet as the caisson body is built up over the rig.

The cable 88 extending from the housing 16 carries leads 72 and 74 for feeding energizing current to the solenoid 18, and leads 32 for transmitting a time-zero signal.

The detecting systems essentially serve to measure three characteristics. Thus, the time required for the sonic pulses to traverse the caisson from the generator to the surface detector can be measured by comparing the arrival of the time-zero signal with the first indication on the oscilloscope of sound pulse detection. The amplitude and wave shape of each pulse serve as two additional characteristics which can be directly determined by recording on the oscilloscope. In this connection, the location of the pulse generator by means of the rig described provides for transmittal of the pulses through the body of the caisson whereby the results obtained will be influenced almost entirely by the internal structure of the caisson.

In addition to providing a surface detector, the invention contemplates the location of sound pulse detectors at other locations. For example, a detector may be located adjacent the sound pulse generator 14 in the middle of the caisson. If a piezoelectric crystal is used at the time-zero detector, this detector will also furnish readings resulting from pulses generated from the rig at the bottom of the caisson. With intermediate provisions of this nature, the location of defects may be isolated.

It will be understood that pulse-producing systems are contemplated where no wires are used between the sonic pulse generator and the surface. In such cases, triggering of the solenoid may be carried out from the surface by wireless means and the time-zero may be indicated by transmission of electromagnetic waves. The energy necessary for the production of the sonic pulses may be provided in limited amounts by means of electrical storage devices such as batteries in the pulse generator enclosure or the energy may be transmitted to the pulse generator from the surface by means of electromagnetic waves.

It will also be understood that evaluation of the interface between foundation piers and the surrounding soils can be accomplished with systems of this invention. Evaluation of the region between foundation piers by means of the buried pulse generators is also intended as part of the invention. These evaluations are accomplished by locating detectors in positions for detecting pulses crossing an interface or travelling through surrounding formations form one pier to the the next.

It will be understood that various changes and modifications may be made in the system described which provide the characteristics of the invention.

What is claimed is:

1. In the manufacturing of caissons and similar structural bodies formed of concrete wherein a defined area such as an excavation is filled with the concrete, and the concrete then solidifies into a solid mass, the improvement comprising a method for determining the soundness of the caisson at stages throughout the life of the caisson comprising the steps of mounting a generator adapted to produce sonic pulses in a supporting structure, locating said supporting structure in a desired position in said defined area, pouring concrete around the supporting structure to thereby embed the generator within the concrete, introducing additional concrete to fill said defined area and to thereby complete the caisson, said generator being thereby embedded in the caisson at a location remote from an end of the caisson whereby a substantial portion of the caisson body extends between the generator and said end, operating said generator during the initial forming of the caisson body to produce sonic pulses, positioning a pulse detector at a location remote from said generator with at least a portion of the caisson being located between said generator and the detector, and recording the characteristics of pulses detected by said pulse detector to provide an indication of the soundness of said caisson, and repeating the steps of operating said generator and recording at various later stages in the life of the caisson body.

2. A method for determining the soundness of a structure in accordance with claim 1 including the step of providing a detector adjacent said generator and recording the magnitude of the sound pulse in this area whereby this magnitude can be compared with the magnitude of the pulse detected by the remote detector.

3. A method for determining the soundness of a structure in accordance with claim 1 wherein said detector measures the time required for transmission of a sonic pulse from said generator through said structure body to said detector.

4. A method for determining the soundness of a structure in accordance with claim 4 including the step of providing electrical contacts to be closed upon initiation of a sonic pulse, and recording the time of closing of said contacts to provide an indication of the starting point of pulse transmission.

5. A method for determining the soundness of a structure in accordance with claim 1 wherein said detector measures the wave shape of the pulse transmitted through said structure body.

6. A method for determining the soundness of a structure in accordance with claim 1 wherein said sonic pulse generator is located adjacent the bottom of said structure and said detector is located at the top of said structure.

7. A method for determining the soundness of a structure in accordance with claim 6 wherein at least one additional sonic pulse generator is located at an intermediate point along the length of the structure.

8. A method for determining the soundness of a structure in accordance with claim 6 wherein at least one additional detector is located at an intermediate point along the length of said structure.

9. In a concrete, structure, the improvement in means for testing the soundness of the structure comprising a sonic pulse generator located in the body of the structure, said sonic pulse generator comprising electrically operated striker means, a solenoid, the core of said solenoid carrying said striker means, and a striker plate engaged by said striker means when said solenoid is operated, electrical control means for controlling the operation of said solenoid, said electrical control means including lines leading to the solenoid for energizing the solenoid, and an adjustable timing circuit for controlling the duration of power input to said solenoid whereby a power input exceeding the normal rating for said solenoid can be applied for a short duration to avoid destruction of the solenoid while at the same time producing an impact of high magnitude, a housing enclosing said striker means, and a frame supporting said housing, said housing and frame being embedded in said body, means for supplying electrical power to said control means for operating said striker means, a sonic pulse detector positioned at a location remote from said generator with at least a portion of the body of said structure being located between said generator and said detector, said detector operating to record the characteristics of pulses generated to provide an indication of the soundness of said structure.

10. A structure in accordance with claim 9 wherein said sonic pulse generator comprises a striker adapted to be forced into contact with a surface defined in said housing to thereby produce said pulses, and including electrical switch means in said housing, means for closing said switch means at the same time said striker engages said surface, and leads extending to said detector to provide an indication of the moment the striker contact takes place.

11. A structure in accordance with claim 10 wherein said sonic pulse generator comprises a solenoid with the core of the solenoid comprising said striker, and wherein said core carries means for engaging said switch means.

12. A structure in accordance with claim 9 wherein said sonic pulse detector is connected to an oscilloscope whereby a wave shape display is provided for indicating the characteristics of pulses generated.

* * * * *